K. STIMECZ.
STRIPPING ATTACHMENT FOR FORKS.
APPLICATION FILED MAY 29, 1917.
1,255,945.
Patented Feb. 12, 1918.
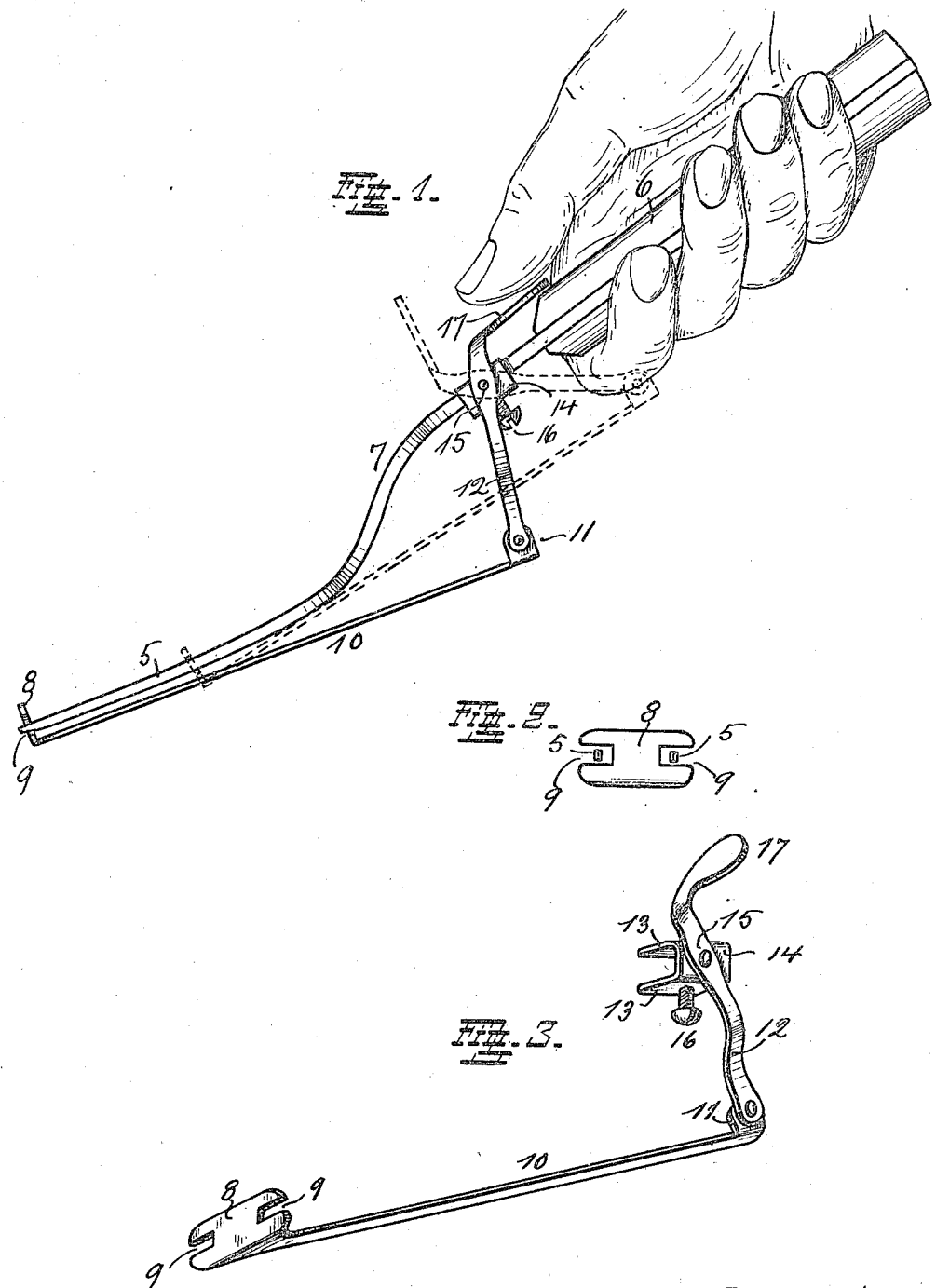
Inventor.
Karl Stimecz
by C. Spengel Atty

UNITED STATES PATENT OFFICE.

KARL STIMECZ, OF HAMILTON, OHIO.

STRIPPING ATTACHMENT FOR FORKS.

1,255,945.  Specification of Letters Patent.  Patented Feb. 12, 1918.

Application filed May 29, 1917. Serial No. 171,776.

*To all whom it may concern:*

Be it known that I, KARL STIMECZ, residing at Cincinnati, Hamilton county, State of Ohio, have invented a certain new and useful Stripping Attachment for Forks, of which the following is a clear, full, and exact description, attention being called to the drawing, which accompanies this application and forms a part thereof.

This invention concerns devices used in connection with forks, more particularly carving forks and forks used for handling fruit while packing the same into jars and serving as a means for conveniently clearing the tines of the fork of the matter impaled thereon.

The object of this invention is to construct such a device in a very simple manner and to have it in form of an attachment which may be readily removed when its use is not desired and which also facilitates cleaning of it as well as of the fork.

The invention consists of the particular construction of such a device as the same is hereinafter described and pointed out in the claim.

The construction is also illustrated in the accompanying drawing in which:

Figure 1. is a perspective view of a fork with my attachment in position, illustrating also manner of its manipulation.

Fig. 2. shows an end view of the fork with my attachment in position.

Fig. 3. is a perspective view of the attachment removed.

In the drawing numerals 5—5 indicate the tines of the fork and numeral 6 indicates the handle thereof.

Numeral 7 indicates the shank between the tines and the handle and whereby the former are connected to the latter.

The particular construction of the handle is immaterial, it may be an integral extension of the shank or, as shown, the latter may be extended to form a tang to which the handle is connected.

My attachment comprises a device which serves to clear the tines of the matter impaled thereon, of means for actuating this device and of means for connecting the attachment in position, the connection being of a character which permits ready removal.

The device first mentioned comprises a stripper plate 8 substantially rectangular, arranged in a plane at right angles to the tines and supported on them and guided for reciprocal movement thereon, by means of notches 9—9 in opposite edges of this plate which receive the tines.

The means for actuating this plate consist of a push bar 10 extending rearwardly from the lower edge thereof and forming an integral part of the same.

At the rear end of this bar a lug 11 is formed for connection to the actuating lever 12.

This lever is pivotally mounted upon the means whereby the attachment is connected in position on the shank of the fork, said means being in form of a coupling which comprises two opposite flanges 13, spaced from each other to admit the shank of the fork between them and preferably formed in one piece bent to shape with the intermediate part 14 between them.

Lever 12 is mounted on this intermediate part 14 by means of a pivot 15.

This coupling is removably held to the shank of the fork by means of a clamping screw 16 mounted in either one of the flanges and adapted to engage the shank of the fork by means of its end and thereby clamping it to the opposite flange.

The free end of lever 12 is shaped into a thumb piece 17 for convenient operation.

The stripper plate readily yields rearwardly on the tines when these latter are inserted into the object to be held which movement also places the thumb piece on the lever in position for ready manipulation as shown in the drawing.

No spring is required in connection with this device.

A fork so equipped may also be used to advantage in handling fruit while the same is being packed into jars and avoids the necessity of touching the same with the hands.

The facility whereby the attachment may be quickly removed and replaced is also of advantage inasmuch as it permits thorough and efficient cleaning of the same as well as of the fork.

Having described my invention I claim as new:

In a stripping attachment for forks, the combination of a coupling consisting of two spaced flanges adapted to receive between them the shank of a fork and integrally combined by an intermediate member, a clamping screw seated in one of these flanges and adapted to hold the coupling to the shank of the fork by clamping said shank against the other flange, a lever mounted on the intermediate member mentioned so as to extend above and below the shank of the fork, a thumb-piece formed on one end of this lever and a push-rod connected to its other end, the forward end of said push-rod being bent up at an angle and shaped to form a stripper plate which extends between the tines of the fork and is notched in its opposite upright edges to receive said tines to be supported and guided by them.

In testimony whereof I hereunto affix my signature.

KARL STIMECZ.

Copies of this patent may be obtained for five cents each, by addressing the "Commissioner of Patents, Washington, D. C."